United States Patent [19]

Fillar

[11] Patent Number: 5,215,616
[45] Date of Patent: * Jun. 1, 1993

[54] METHOD FOR MANUFACTURING A HIGH STRENGTH, NON-METALLIC TRANSMISSION CHAIN

[75] Inventor: John A. Fillar, New Berlin, Wis.

[73] Assignee: Envirex Inc., Waukesha, Wis.

[*] Notice: The portion of the term of this patent subsequent to Sep. 5, 2006 has been disclaimed.

[21] Appl. No.: 851,235

[22] Filed: Mar. 11, 1992

Related U.S. Application Data

[60] Continuation of Ser. No. 471,877, Jan. 29, 1990, abandoned, which is a division of Ser. No. 175,620, Mar. 25, 1988, Pat. No. 4,932,927, which is a continuation of Ser. No. 840,116, Mar. 14, 1986, abandoned.

[51] Int. Cl.⁵ ............................................. B65H 81/00
[52] U.S. Cl. .................... 156/173; 156/169; 156/175; 156/189; 156/190; 156/250; 156/180; 59/84
[58] Field of Search .................. 59/900, 84, 35.1; 474/207; 74/579 R; 156/173, 169, 172, 175, 189, 190, 250, 174, 180

[56] References Cited

U.S. PATENT DOCUMENTS

| | | | |
|---|---|---|---|
| 176,481 | 4/1876 | Richardson | 156/189 |
| 1,729,329 | 9/1929 | Chilton | 156/189 X |
| 2,268,865 | 1/1942 | Freedlander | 156/189 X |
| 2,279,278 | 10/1966 | Eldred | 74/579 |
| 3,153,898 | 10/1964 | Gerhardt | |
| 3,231,069 | 1/1966 | Lanham | |
| 3,362,252 | 1/1968 | Ditlinger | 74/579 |
| 3,388,615 | 6/1968 | Ditlinger | 74/579 R |
| 3,460,628 | 8/1969 | Tankersley | 156/169 X |
| 3,697,348 | 10/1972 | Farnam | 156/190 |
| 3,733,811 | 5/1973 | Florjancic | |
| 4,123,947 | 11/1978 | Smith et al. | |
| 4,250,764 | 2/1981 | Grant | |
| 4,272,952 | 6/1981 | Graham | |
| 4,552,035 | 11/1985 | Skipper | 59/84 X |
| 4,757,681 | 7/1988 | Matsuno et al. | |
| 4,863,418 | 9/1989 | Fillar et al. | 59/59 X |

FOREIGN PATENT DOCUMENTS

| | | |
|---|---|---|
| 1135731 | 8/1962 | Fed. Rep. of Germany . |
| 3408295 | 10/1964 | Fed. Rep. of Germany . |
| 830567 | 3/1960 | United Kingdom ................. 59/35.1 |

OTHER PUBLICATIONS

Bulletin 1158, Jeffrey Manufacturing Division, Dreuer Industries, Inc. entitled "Acetal Resin Termoplstic/SS Chain for Sludge Collector Service".

Primary Examiner—Jeff H. Aftergut
Attorney, Agent, or Firm—Michael, Best & Friedrich

[57] ABSTRACT

A link assembly for a lightweight, non-metallic, conveyor or load transmission chain having significantly greater strength and other performance improvements compared to previous non-metallic chain links is disclosed. Each link assembly includes: a pair of identical sidebars each comprised of high-strength filamentary material wound in an elongated loop configuration and fixed in a matrix of hardened resin; a connecting pin having a stiff reinforced composite core and a skin-tight sleeve of non-abrasive material; low friction bushing means between the sidebars and connecting pin; and retaining means for holding the assembly together.

Methods of making the unique sidebar and connecting pin components are also disclosed.

3 Claims, 3 Drawing Sheets

METHOD FOR MANUFACTURING A HIGH STRENGTH, NON-METALLIC TRANSMISSION CHAIN

This is a continuation of co-pending application Ser. No. 471,877, filed on Jan. 29, 1990, now abandoned, which is a division of co-pending application Ser. No. 175,620 filed Mar. 25, 1988, now U.S. Pat. No. 4,932,827 which is a continuation of patent application Ser. No. 840,116 filed Mar. 14, 1986, now abandoned.

FIELD OF THE INVENTION

This invention relates to non-metallic, high-load transmission or conveyor chain and, more particularly, to an improved, all plastic, high strength-to-weight ratio chain link assembly especially well suited for sludge collector chain used in sewage treatment plants.

BACKGROUND OF THE INVENTION

Imagine a power transmission or conveyor chain made of an economical, corrosion resistant material, yet having a very high strength-to-weight ratio. There are indeed a broad range of applications for such a chain wherever either of those properties are important. For example, in grain and cement elevators, the weight of the chain used to lift bulk materials is itself a major contributor to the load on itself and the drive system. In food processing or underwater operations, corrosion resistance is an essential requirement.

Chain made in accordance with the invention can be used advantageously in those and other applications to transmit heavy loads in a hostile corrosive environment. However, it was initially developed to satisfy a long standing need for an improved sludge collector chain to operate under conditions where both basic properties, as well as dimensional stability, are extremely important.

Sludge collector chains are typically employed in pairs of parallel strands which between them support elongated flights. The flights travel under the pull of the chains to scrape the accumulated sludge settled along the bottom of a sewage treatment tank. Such tanks typically range in length up to 350 feet, and in depth up to 15 to 20 feet. The sprocket driven, submerged chains for these tanks are quite long, endure heavy tensile loads and operate in a corrosive environment.

Initially sludge collector chain was formed of malleable cast iron which was very heavy and unwieldly, required considerable power to drive it, and was vulnerable to corrosion by most wastewater. Such cast chain is still used in many larger settling tanks because of the heretofore unavailability of a non-metallic chain having adequate pulling strength.

In more recent times chain manufacturers have struggled to replace the heavy cast metal with corrosion resistant non-metallic materials, particularly plastics. Plastic chain offers the advantage of lower weight which thereby reduces chain load, power consumption, wear, and installation costs. Although a few of these plastic chains, representatives of which are discussed below, have proven acceptable in some smaller sludge collector applications, none of the heretofore commercially available ones have had enough strength to operate in the larger tanks.

U.S. Pat. Nos. 4,123,947 and 4,250,764 are illustrative of typical plastic sludge collector chains in use today. These chains comprise a series of single piece, hermaphroditic links made of a synthetic resin and connected together by non-metallic pins. The chain design shown and discussed in U.S. Pat. No. 4,272,952 is similar except that the chain link is comprised of two identical half links permanently joined together. The complexly shaped links of these prior chains are made by injection molding.

The success of these previous plastic sludge collector chains has been limited primarily because of their limited pulling strength. None of these commercial chains has an ultimate breaking strength greater than about 7,000 lbs. force, and therefore these chains can only be used in lighter duty applications. None come close to having a strength approaching that of cast iron chain.

As mentioned variously in the aforementioned patents, persons skilled in the art heretofore recognized that higher strengths could be achieved with glass fiber reinforced resin or equivalent composites; but they were constrained in their effective use of such composites by concerns that:

a. such stronger composites cannot be molded into the complex shape of conventional sludge collector chain;

b. such composites were too highly abrasive and therefore produce excessive wear on mating parts; or c. that any conceptually suitable composite chain design would be too costly.

The plastic chain links shown in the three aforementioned patents have in common with their predecessor cast metal chains, a complex shape including curved sidebars with widened bearing surfaces or edges intended to engage annular rims on so-called "chain-saver" sprockets. The only practical method of forming synthetic resins into such intricate shapes is by molding, typically injection molding. The types of reinforcement that can be used effectively in injection molding is limited. In the case of fibers, they must be discontinuous and usually fairly short. Also, because the fibers flow with the resin in the mold, it is difficult to control their final orientation to effect maximum reinforcement.

However, the prevailing property needed in a material for the links themselves, and particularly the sidebars, is tensile strength. In the case of fiber reinforced materials, the optimum tensile strength results when the high strength filaments are aligned parallel to the direction of pull, and particularly if the filaments are continuous.

The art of filament winding a ring or looped member to take advantage of the foregoing reinforcement principle was tried on other kinds of chain. The patentees of U.S. Pat. Nos. 3,153,898 and 3,744,811 employed a filament wound, fiber reinforced plastic to make links for an anchor chain "with a strength surpassing that of welded steel". However, this type of chain is not subject to repeated cyclical articulation between connected links, and therefore not vulnerable to wear due to the abrasiveness of the composites. Accordingly, this anchor chain technology is not readily transferable to articulating conveyor chain such as sludge collector chain.

German Patent 1,135,721 illustrates and discloses a sprocket driven transmission type chain having sidebars with filament wound, reinforced plastic cores. The sidebars are formed by winding filaments through a slit in a loop-shaped mold which then becomes a non-abrasive jacket for the finished link. It is not known to me if this chain construction was ever developed to a successful commercial product, or, if so, for what kind of application. However, it is apparent that it was never adapted to a design for sludge collector chain, as evidenced by the later issued U.S. Pat. Nos. 4,123,947; 4,250,764 and 4,272,952, which represent the practical state-of-the-art. Furthermore, as will be more apparent from the detailed description of the present invention, the method of making a chain as taught in German Patent 1,135,721 is too costly to be competitive with the chain and process taught herein.

Thus, despite the existence of some knowledge of using filament winding to reinforce plastic links for chain, the designers of conveyor chain, particularly sludge collector chain, struggled along until now with the material constraints imposed by their conventional wisdom dedicated to a classified configuration which required molding. They occupied themselves with improving pin characteristics or connectibility between links, and apparently conceded that a truly high strength chain of this type couldn't be made at a realistic cost.

It is therefore a principal object of the present invention to provide a chain link assembly for a truly high strength, non-metallic transmission or conveyor chain at a competitive cost.

It is a more specific objective of the present invention to provide a commercially affordable non-metallic chain link assembly suitable for sludge collector chain, which is stronger than any of the previously available non-metallic chains suitable for that application.

It is another object of the present invention to provide a link assembly having sidebars of a non-metallic material reinforced with high strength filamentary material oriented to maximize the tensile strength of the sidebar to yield a chain having a high strength-to-weight ratio.

It is another object of the invention to provide a plastic chain having strong and long lasting sidebars and connecting pins separated by and assembled with low cost replaceable wear members.

It is another object of the present invention to provide a high strength plastic chain link assembly comprising multiple components which is easily assembled, dissassembled and/or connected to other links, without the need of special tools.

It is a further object of the invention to provide a method of forming high-strength, filament wound reinforced plastic sidebars for a transmission or conveyor chain link.

It is a still further object of the invention to provide a method of making a high-strength, non-abrasive, reinforced plastic connecting pin for a transmission or conveyor chain.

SUMMARY OF INVENTION

The foregoing and other objectives are met by a chain link assembly, made in accordance with the invention, comprising several easily assembleable, design-balanced components, each with optimum properties for their respective functions in the assembled link. A pair of identical sidebars, in the form of symmetrical elongated open loops, are each made of a hardened resin reinforced with continuous, high-strength filamentary material wound in the configuration of the loop to optimize the pulling strength of the sidebar. A pin, for connecting one end of the pair of sidebars to a pair of similar sidebars in an adjacent link, comprises a cylindrical body of hardened resin reinforced with longitudinally extending, high-strength filamentary material distributed uniformly across its cross-sectional area. As a further enhancement of its properties and function, the connecting pin is provided with a tight fitting, formed-in-place plastic sleeve to provide a non-abrasive, low-friction, bearing surface.

To prevent abrasion between the sidebars and the connecting pin, relatively inexpensive wear members made of low friction plastic materials are provided and act as permanently lubricated bushings. The connecting pin rotates freely in all such bushings. As a further feature of the chain link assembly a separate cylindrical roller, also made of a low friction polymeric material, is disposed about the connecting pin between the sidebars, to provide a freely rotatable and low wearing interface with the sprockets used to drive the chain. The chain link is held together by mechanical retaining means, also preferably of a corrosion resistant material, at the ends of the connecting pin.

A sludge collector chain made of such link assemblies is not only lightweight and resistant to corrosion, but offers the important additional advantages of significantly higher pulling strength and dimensional stability than the plastic chains used heretofore. Moreover it can be easily assembled using only a conventional tool for the retaining means and can be reconditioned by replacing the relatively inexpensive wear members while reusing the more costly structural components.

The superior strength of the improved chain link assembly is achieved at a feasible cost in a competitive market by reason of the unique design of the sidebars and connecting pin and the methods of making them. The process for forming the sidebar comprises wetting a continuous strand or strands of high strength filamentary material with a hardenable, thermosetting, liquid resin, convolutely winding the wetted strand or strands under tension in a continuous loop at a substantially 90° angle and curing the resin to form a matrix which fixes the taut strands.

This process allows the production of a sidebar having a near perfect alignment of the filamentary reinforcement to provide maximum tensile strength. It lends itself to the production of such sidebars at a mass production rate. In addition it permits the simultaneous formation of small projections of resin on the inner surface of the sidebar. These projections serve to readily locate and longitudinally fix the associated bushing elements to insure that the proper chain pitch is maintained even during slackened operating conditions.

The connecting pin is made by first forming a cylindrical core of hardened resin encapsulating longitudinally taut strands of high strength filamentary material, such as by a pultrusion process. Then a thin tube of low friction plastic material is formed separately, placed about the core while at an elevated temperature, and shrunk upon cooling into a skin-tight non-slipping sleeve which functions as a non-abrasive bearing surface.

BRIEF DESCRIPTION OF THE DRAWINGS

Having thus briefly described the invention in its broader aspects, additional advantages and features are now discussed in more detail with reference to the accompanying drawings, which form part of this specification, and of which.

Figure 1:
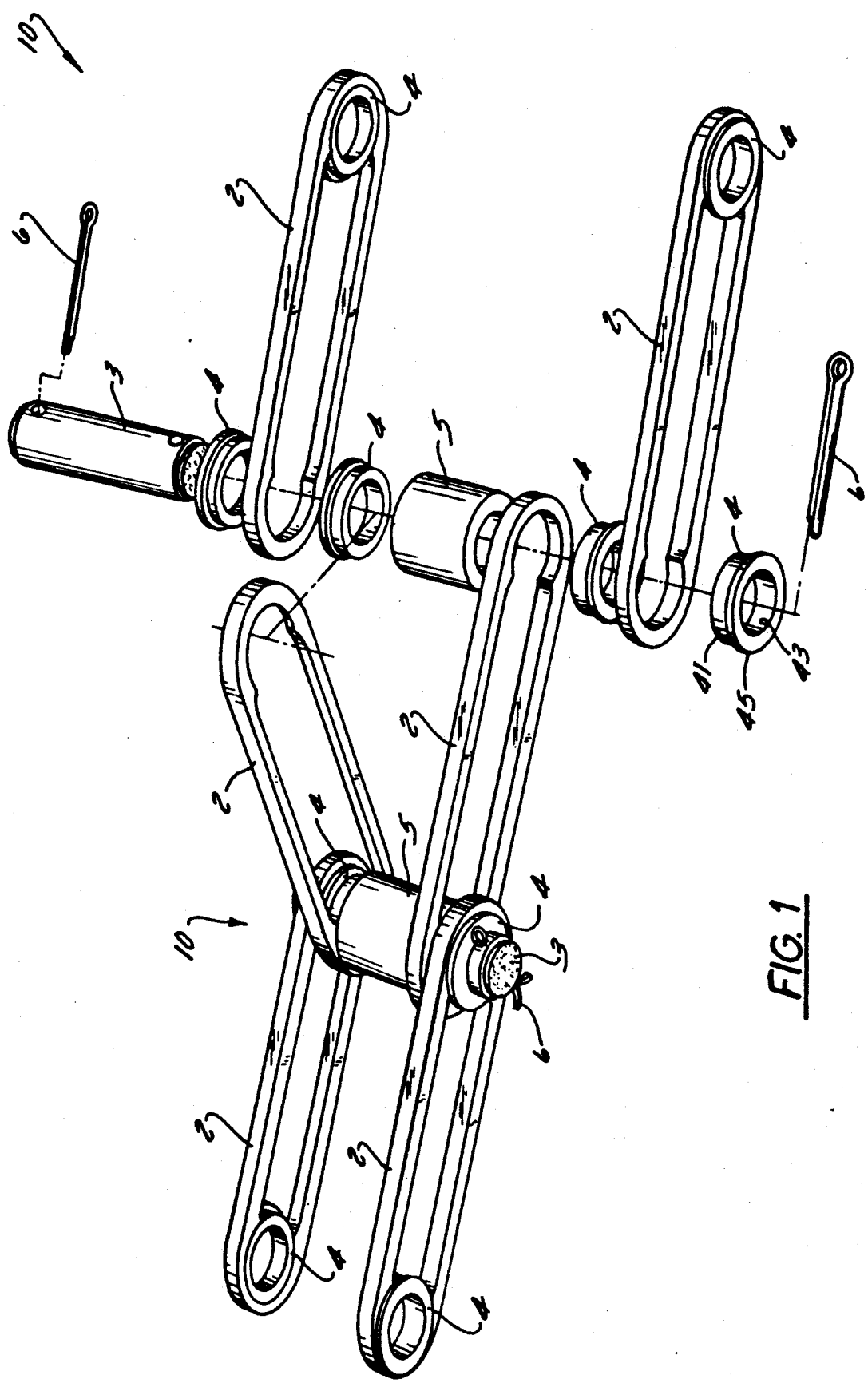
FIG. 1 is a partially exploded isometric view, showing a chain link assembly in accordance with the present invention in both an assembled condition and an adjacent like assembly in an exploded condition to display its various components.

The chain link assembly, which is indicated generally by the numeral 10 in FIGS. 1 through 5, consists of two identical sidebars 2, a connecting pin 3, four bushings 4, a roller 5 and two cotter pins 6.

Figure 6:
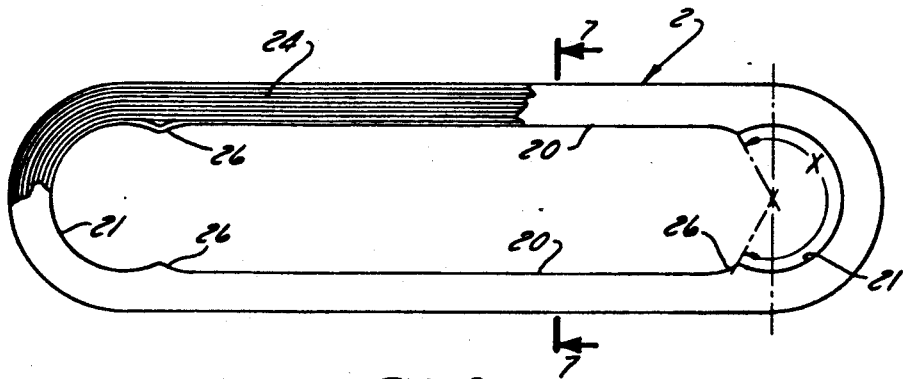
FIG. 6 is a side elevational view of one of the sidebars of the link assembly of FIGS. 1-5.
Figure 7:
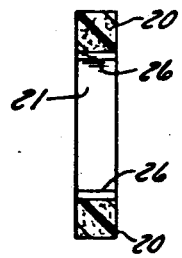
FIG. 7 is a cross-sectional view through the link sidebar of FIG. 6 as taken along the line 7—7 in FIG. 6.

Referring to FIGS. 6 and 7, the typical sidebar 2 is in the shape of a flattened open loop having a pair of straight and parallel center sections 20 integrally connected by curved end sections 21. The sidebar is comprised of a hardened resin matrix reinforced by high tensile strength, continuous filaments 24 which have been wound in parallel paths around the loop. The filaments 24 are evenly distributed across the rectangular cross-section of the sidebar. Since the loads applied on the sidebars 2 are opposed pulling forces applied at the respective curved ends of the sidebar 2 generally parallel to the center sections 20, the aforementioned composite material maximizes the tensile strength of the sidebar. It has been observed that the open loop configuration is stronger than one having a web filling the center of the loop, such as might be suggested by the molded shapes of earlier sludge collector chains, because of the reduction of stress concentration points.

While the particular resin chosen for the sidebar 2 will depend on certain application and cost considerations, as well as its compatibility with the reinforcement chosen, thermosetting polyester and epoxy resins are generally preferred. Similarly, while glass filaments are probably the most affordable today, other high strength filamentary materials, such as steel, carbon or aramid, could be used if economically available. The reinforcement 24 is preferably a strand or roving of continuous or substantially continuous filaments, and a textured strand may be used if delamination is a concern.

In one tested embodiment of the invention, a sidebar having an epoxy resin matrix with 60-80% by weight glass fiber reinforcement produced excellent test results and field performance.

The sidebar 2 is formed by convolutely winding the reinforcement 24, which has been wetted with uncured resin, under tension, about a mandrel until the desired width and thickness is built up. The resin is then cured to permanently fix the taut filaments in place. The winding is preferably done at a consistent 90° angle of wind (with respect to the axis of rotation of the mandrel) and that the filamentary reinforcement is near perfectly aligned parallel with the loop. It is an added feature of this method that by using a wide mandrel, a wide flattened filament wound tube can be formed and then sliced into predetermined widths to yield a plurality of sidebars on an economically large batch basis. This method of making filament wound sidebars lends itself to higher production rates and is clearly more economical than the process described in German Patent 1,135,721.

The curved section 21 of the symmetrical sidebar 2 has a semicircular inside surface for the seating of a bushing 4. By providing small grooves in the forming mandrel, resin is squeezed into the grooves during the winding operation. When cured, the sidebars are thus formed with integral, inwardly extending projections 26 of hardened resin which extend the interior curved surface of the end section to a circular arc X greater than 180°. These projections 26 serve to locate and maintain the bushings 4 longitudinally and concentrically at the ends of the sidebar. This feature prevents any inadvertent variation in chain pitch such as might be occasioned by slackening of the chain and intrusion of debris between sidebar and bushing.

Figure 8:
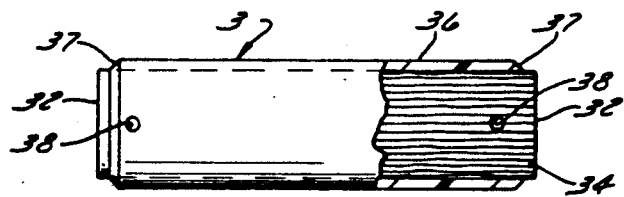
FIG. 8 is a side elevational view, partly in cross-section, of the connecting pin of the link assembly of FIGS. 1-5.

Referring now to FIG. 8, the connecting pin 3 consists of a cylindrical core 32 having a tight fitting sleeve 36 and a pair of drilled holes 38 at its ends for receiving cotter pins 6. The core 32 is again preferably a composite of a hardened thermoset resin reinforced by high strength filamentary material 34 extending generally longitudinally along the core. In the aforementioned tested embodiment, a core of polyester resin reinforced with continuous glass filaments was made by a pultrusion process. Such a construction provides a very stiff and high shear resistant pin having a modulus of flexure in excess of 1.5 million pounds per square inch.

Because glass fiber reinforced plastic composites generally provide very abrasive surfaces, the sleeve 36 provides a non-abrasive bearing surface for the bushings 4 and roller 5. The sleeve is comprised of a relatively low friction plastic material, which is separately injection molded, placed about the core 32 while still hot, and shrunk upon cooling to a skintight fit with the core. In the tested embodiment, the sleeve 36 is a thermoplastic acetal resin.

As stated before, glass fiber reinforced plastic tends to be very abrasive against other materials because the ends of the glass fibers become exposed on the surface as the softer matrix resin wears away. Therefore, the bushings 4 are provided to isolate the abrasive sidebars 2 from the outer surface of connecting pin 3. The sidebars 2 could be coated or clad with a low friction material, but not only is this a costly step, when the cladding or coating wears away the sidebar would have to be scrapped. Therefore, the use of the separate but inexpensive bushings 4 is a preferred solution to the wear problem.

As shown in FIG. 1, the bushings each consist of a hub 41 and integral annular flange 45. The bore of the bushing 43 is sized to provide a free rotating fit about the outer surface of the sleeve 36 of the connecting pin 3. The hub 41 has an outer diameter sized to provide a snug frictional fit against the inner surface of the curved section 21 of a sidebar 2. If desired, the inner surface of the curved end section 21 of the sidebar can be roughened to enhance the frictional engagement between the bushing and sidebar. This will further insure that the bushing does not rotate in the more abrasive sidebar, which would lead to premature wear of the bushing. Preferably, the fit between the sidebar section 21 and the hub 41 of the bushing is such as to provide an easy snap fit of the bushing into the sidebar with only slight finger pressure.

It is an important feature of this chain link that the connecting pin 3 rotates freely with respect to all of the sidebars, thus providing for more uniform wear and longer life of all the parts. It will be found that in nearly all prior art chains of this type, and particularly sludge collector chains, the connecting pin is integral with one link or is non-rotatably fixed with respect to at least one set of sidebars. Such arrangements also cause some scuffing and wear on associated sprockets.

The annular flange 45 of the bushing also provides a low friction barrier between the overlapping sidebars of adjacent links as they articulate around a sprocket. The flange is only slightly smaller in diameter than the outside diameter of the curved end section 21 of a sidebar 2. The bushings are placed so that the flange 45 is to the outside of a link such that they, rather than a sidebar 2, provide the contact surface for the cotter pin 6 or other retaining means. This feature prevents the cotter pin from interferring with articulation of the sidebar and from abrading it.

The material of the bushing can also be chosen from a range of materials having low friction properties, but it is preferable that it be different than the material used for the sleeve 36 of the pin 3 so as to avoid the tendency of like materials to weld together. Experience indicates that the material should have a coefficient of friction, when in contact with the pin 3 or roller 5, of less than 0.5. In the referenced tested embodiment a thermoplastic polyester resin was used for the bushings 4 and performed satisfactorily.

The link assembly 10 is intended for transmission chain that is driven by and engages sprockets. The roller 5 is provided to reduce the wear at the interface between the connecting pin of the chain and the sprocket teeth. The roller 5 is tubular in shape having an inside diameter such that it rotates freely about the connecting pin 3, an outer diameter sized according to the associated sprocket configuration, and a length to fit freely, but without excessive lateral play, between the inner pair of sidebars of the assembled chain. The roller should be made of a low friction, but durable material; again preferably different from the material of the pin sleeve 36. Nylon has tested and operated suitably in the referenced practical embodiment of the invention.

The last component of the link assembly of FIGS. 1-5 is the retaining means, which in the illustrated embodiment is a pair of cotter pins 6. A variety of other well known retaining means could be substituted for the exemplary cotter pins; but preferably they should also be of a non-corrodable material such as stainless steel or even plastic.

Figure 2:
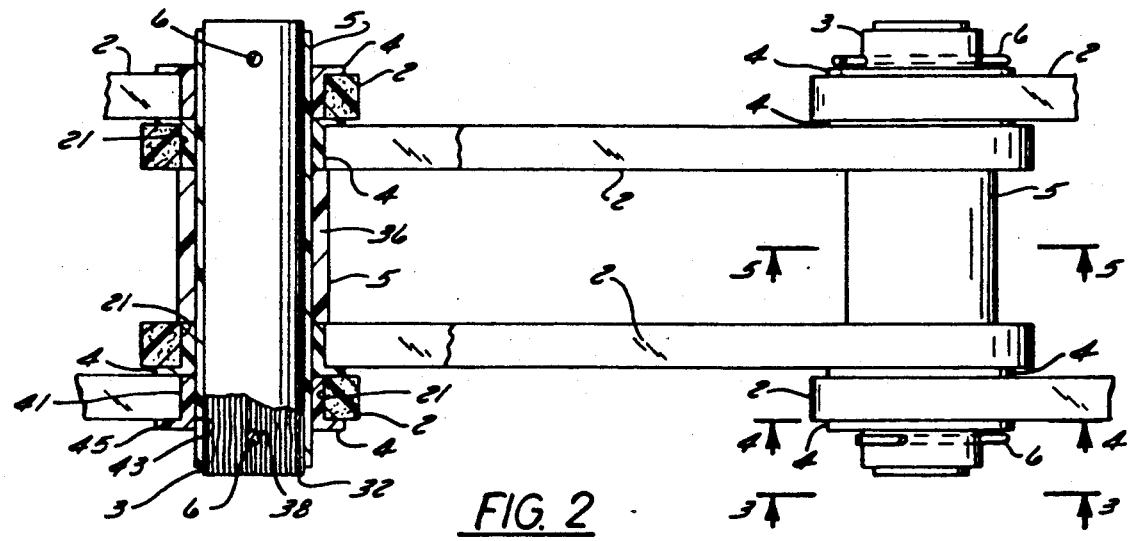
FIG. 2 is a plan view of an assembled chain link, made in accordance with the present invention, connected to the overlapping ends of adjacent like links, with one end of the assembly in cross-section.
Figure 3:
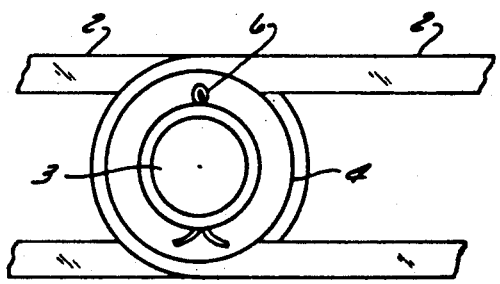
FIG. 3 is a side elevation of the connection between two link assemblies as viewed along the line 3—3 in FIG. 2.
Figure 4:
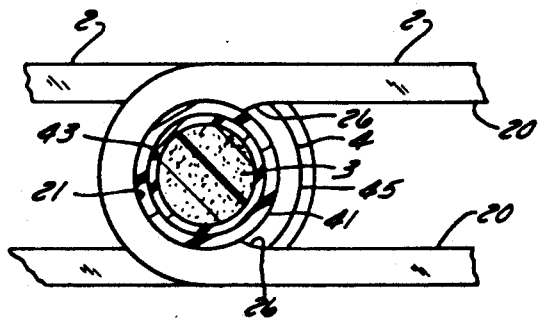
FIG. 4 is a cross-sectional view through the connection between the same two link assemblies as viewed along the lines 4—4 in FIG. 2.
Figure 5:
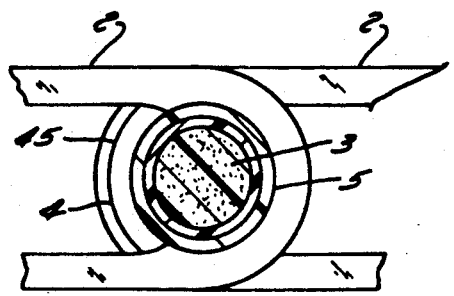
FIG. 5 is a cross-sectional view through the connection between the same two link assemblies as viewed along the lines 5—5 in FIG. 2.

An important feature and advantage of the invention is the ease with which the various components just described can be assembled to make the chain links 10 illustrated in FIGS. 1 and 2. The first step is to insert a bushing 4 at each end of each sidebar 2. Because of the designed moderate press fit and the projections 26, the bushing 4 can be easily located and inserted by hand. Next, two pairs of sidebars 2 are arranged with their ends overlapping, one pair being placed between the other pair. This step is simplified by the fact that the sidebars 2 are symmetrical and end-to-end reversible. A roller 5 is placed between the inner pair of sidebars and a connecting pin 3 passed through the aligned four bushings and roller. Since the fit is free with respect to both the bushings 4 and the roller 5, the pin 3 can be inserted by hand without need of any tool. The assembly is completed by inserting the cotter pins 6 through the holes 38 at the end of connecting pin 3 and expanding their bifurcated ends. This final step is the only one which may require use of a tool; and that being only a pair of conventional pliers or the like. It is conceivable that by using other known retaining means, such as push nuts, or designing readily conceivable new ones, even the need for this tool could be eliminated.

The ease of assembly of these chain links is of valuable benefit to installers or maintenance personnel who may have to make or break a connection under difficult conditions and without the availability of special tools.

But even more important are the improved performance features of the link assembly 10. Paramount among them is the substantially greater pulling strength provided by the unique sidebars 2 in combination with the unique connecting pin 3. The greatly increased tensile strength of the sidebars 2 is complemented by the structure of the connecting pin 3 which, because of its longitudinal or axial reinforcement, has an extremely high modulus of flexure, in excess of 1.5 million PSI. As a result the pin 3 does not readily bend or deform under the high tensile loads, and thus prevents a misalignment of the sidebars which has lead to failure problems in certain prior art chains.

None of the commercially available plastic sludge collector chains of the prior art have shown by test to have an ultimate strength in tension greater than 7,000 lbs. force or rated operating strength greater than about 2,600 lbs. force. However, the chain described above as a practical embodiment of the invention, and which was of comparable size and similar geometry to the prior art chains, has shown by the same test to have an ultimate strength as high as 27,000 lbs. force and consistently well in excess of 20,000 lbs. force. Because of its strength, this chain is expected to have a working rating of 4500 lbs. force, which is comparable to that of some classic cast iron chains. Therefore, unlike the prior art plastic chains, the improved chain can be used in the larger sewage treatment tanks and handle much larger loads in other applications. Also, since the improved chain link is comprised of all lightweight plastic and reinforced plastic composite components, with the possible minor exception of the retaining means, the resulting chain has a very high strength-to-weight ratio which results in further savings in the drives, sprockets and structural support systems used with it.

It is another very important feature of the invention that the continuous taut reinforcement of the sidebars 2 provides greater creep strength and rigidity. This minimizes stretching of the chain during operation under load and reduces the need for costly and inconvenient adjustments.

It is another important feature of the invention that it facilitates a balanced design. By varying certain dimensional parameters of each component they can all be designed to carry the same design load. This is in contrast to many prior art chains wherein one or more components is overdesigned or unnecessarily strong in relation to the weaker components with which it is associated.

It is still another important benefit of the invention, that owing to the optimized design of each of its components, a chain comprised of links assemblies embodying the invention is expected to have longer economic life than its predecessors. Moreover, because of the use of replaceable, inexpensive wear members to isolate and protect the more costly structural components, the chain link assembly can be easily and economically reconditioned to even further extend the economic life of its principal components. Finally, because the wear members 4 and 5 are sized to rotate freely with respect to the connecting pin 3, and are of low friction materials, this chain link assembly does not require external lubrication.

Figure 9:
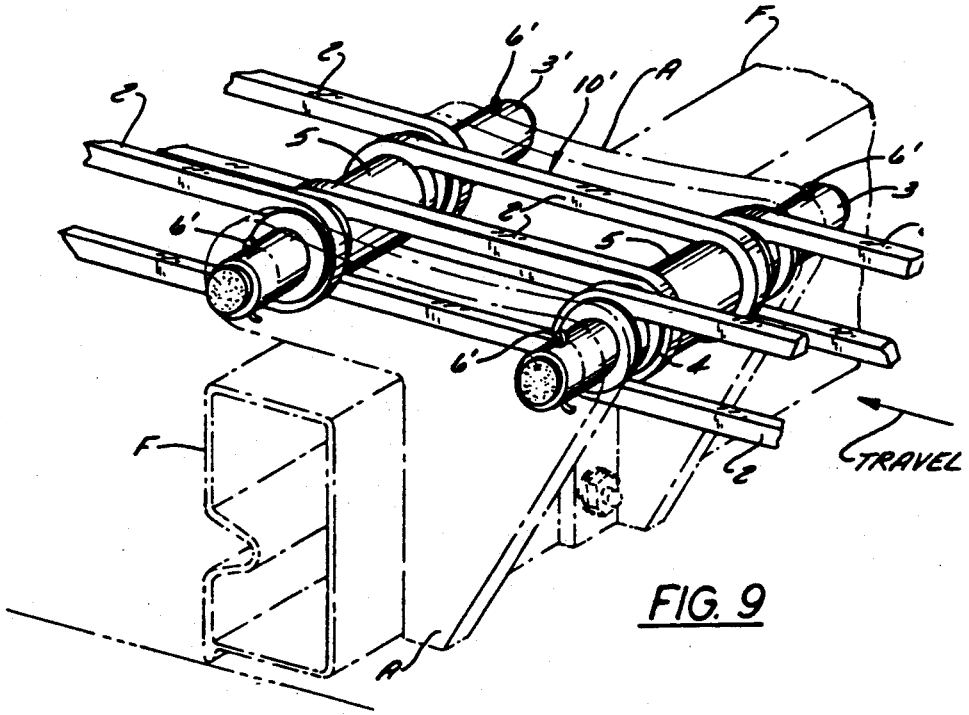
FIG. 9 is an isometric view of a chain link embodying the invention, but modified to accept a pair of attachments (shown in phantom) for a sludge collector flight.

Since the chain link assembly described hereinabove was especially developed for sludge collector application, FIG. 9 is included to show a link assembly 10' modified to accommodate certain flight attachments A (shown in phantom) which will occur roughly every ten feet in a chain of this type. The attachments A in turn support and propel a flight F which extends lateral to the direction of travel on the order of 10 to 20 feet and is similarly connected to an identical chain on the other side of the sewage treatment tank.

The link assembly 10' is in all ways identical to the other links in the chain and to that shown in FIGS. 1–5, except that in order to accommodate the attachment A the connecting pins 3' are proportionally longer, and the retaining means 6' are outboard of the attachments. As the chain drags the flight F along the floor of a settling tank, the load imposed on the flight is transferred through the attachments A to the very stiff connecting pins 3' and ultimately as pure tensile load on the optimally designed sidebars 2.

The invention has been described in the context of its principal aspects and features and by way of an illustrative embodiment. For example, each component has been discussed in connection with one or two materials which are particularly well suited for that component. However, it is recognized that other materials, particularly resins, currently exist that could meet the requirements, although perhaps at a present cost disadvantage, and that new resins and cost reducing processes for making them are constantly evolving. As these equivalent materials become available at competitive costs, they can be substituted for the specific materials discussed herein.

Other features, embodiments, variations and improvements will undoubtedly occur to these skilled in the art as they build on the teaching of the invention, but those unrecited but obvious variations or modifications of the described embodiment and/or equivalents of specifically recited features and components are also viewed as being within the scope of the claims which follow.

What is claimed is:

1. A method for making a high strength non-metallic chain including a plurality of overlapping chain sidebars connected by chain pins, the method comprising the steps of:
   (a) forming a wide flattened filament wound tube, the step of forming the wide flattened filament wound tube including
   providing a continuous strand of high strength filamentary material wetted with an uncured resin,
   convolutely winding the wetted strand under tension onto a mandrel, each winding of the wetted strand forming an elongated loop with elongated generally-parallel sides joined at their ends by symmetrical and identical curved ends, and with the wound strands being substantially parallel and evenly distributed across the width of the mandrel, the winding of the wetted strand being achieved by rotating the mandrel about an axis of rotation and the wetted strand being maintained under tension and defining a substantially consistent angle of approximately 90° with respect to the axis of rotation of the mandrel,
   curing the resin of the flattened filament wound tube to form a matrix fixing the strand to form a hardened filament wound tube,
   (b) cutting the formed wide flattened filament wound tube into a plurality of parallel chain sidebars, the cuts extending parallel to the direction of winding of the strand, each of the sidebars having opposite curved ends,
   (c) providing cylindrical chain pins comprised of high strength, corrosion resistant material, providing bushings comprised of a non-metallic, corrosion resistant material characterized by a low coefficient of friction relative to the material of the sidebars and chain pins, disposing one of the bushings in each of the opposite curved ends of the sidebars, assembling the chain sidebars, bushings, and chain pins to form a chain, the bushings being joined together by the chain pins such that a first pair of chain sidebars are joined to a second pair of chain sidebars in overlapping relation to form a chain with the bushings disposed between the connecting pins and sidebars for free rotation of the bushings relative to the pins, providing means for retaining the bushings and thereby the chain sidebars on the cylindrical chain pins, and causing the retaining means to retain the bushings and thereby the chain sidebars on the chain pins.

2. A method as set forth in claim 1 and further including the step of forming an inwardly extending projection of resin at each end of said elongated loop proximate said curved ends and integrally curing said projection with the remainder of the resin of the elongated loop, the inwardly extending projections forming mechanical means for locating and fixing the bushings, and thereby locating the chain pins in the direction between the curved ends of a sidebar for proper chain pitch.

3. A method as set forth in claim 1 wherein said step of providing chain pins comprises the method of making a chain pin including:
   forming a cylindrical core of longitudinally taut strands of high strength filamentary material encapsulated in a matrix of hardened resin;
   separately forming a thin sleeve of low friction plastic material; and
   placing said sleeve about said core in snug non-slipping engagement with said core.

* * * * *